US012795719B2

(12) United States Patent
Schober et al.

(10) Patent No.: US 12,795,719 B2
(45) Date of Patent: Nov. 10, 2026

(54) APPARATUSES, METHODS, AND COMPUTER PROGRAMS FOR RACH PROCEDURE

(71) Applicant: Nordic Semiconductor ASA, Trondheim (NO)

(72) Inventors: Karol Schober, Oulu (FI); Mauri Nissilä, Oulu (FI); Niko Ohukainen, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 366 days.

(21) Appl. No.: 18/283,419

(22) PCT Filed: Mar. 24, 2022

(86) PCT No.: PCT/EP2022/057832
§ 371 (c)(1),
(2) Date: Sep. 21, 2023

(87) PCT Pub. No.: WO2022/200529
PCT Pub. Date: Sep. 29, 2022

(65) Prior Publication Data

US 2024/0172288 A1 May 23, 2024

(30) Foreign Application Priority Data

Mar. 24, 2021 (FI) ...................................... 20215329

(51) Int. Cl.
*H04W 74/00* (2009.01)
*H04W 74/0833* (2024.01)
*H04W 74/0836* (2024.01)

(52) U.S. Cl.
CPC ...... *H04W 74/006* (2013.01); *H04W 74/0833* (2013.01); *H04W 74/0836* (2024.01)

(58) Field of Classification Search
CPC ......... H04W 74/0833; H04W 74/0836; H04W 74/006; H04W 72/0453; H04L 5/001; H04L 5/0053
See application file for complete search history.

(56) References Cited

U.S. PATENT DOCUMENTS

2019/0239211 A1 8/2019 Martin et al.
2021/0037573 A1 2/2021 Ly et al.
(Continued)

FOREIGN PATENT DOCUMENTS

CN 111567126 A 8/2020

OTHER PUBLICATIONS

Qualcomm "Complexity Reduction for RedCap devices", 3GPP R1-2101766, Jan. 25-Feb. 5, 2021 (Year: 2021).*
(Continued)

*Primary Examiner* — Chuong M Nguyen
(74) *Attorney, Agent, or Firm* — Klarquist Sparkman, LLP

(57) ABSTRACT

A method for a RACH procedure comprises: generating system broadcast information indicating random access channel, RACH, occasions for a RACH procedure of a legacy user apparatus capable of employing a downlink and an uplink initial bandwidth part of a base station of the cellular radio network; and causing a transmission of the system broadcast information in a first downlink portion of the one or more non-overlapping portions of the downlink initial bandwidth part. The system broadcast information also indicates i) a set of the RACH occasions for the reduced capability user apparatus that are confined to one or more non-overlapping portions of the uplink initial bandwidth part, and ii) at least one of the one or more non-overlapping portions of the downlink initial bandwidth part containing a control resource set for a random access response and/or a
(Continued)

Figure 1:
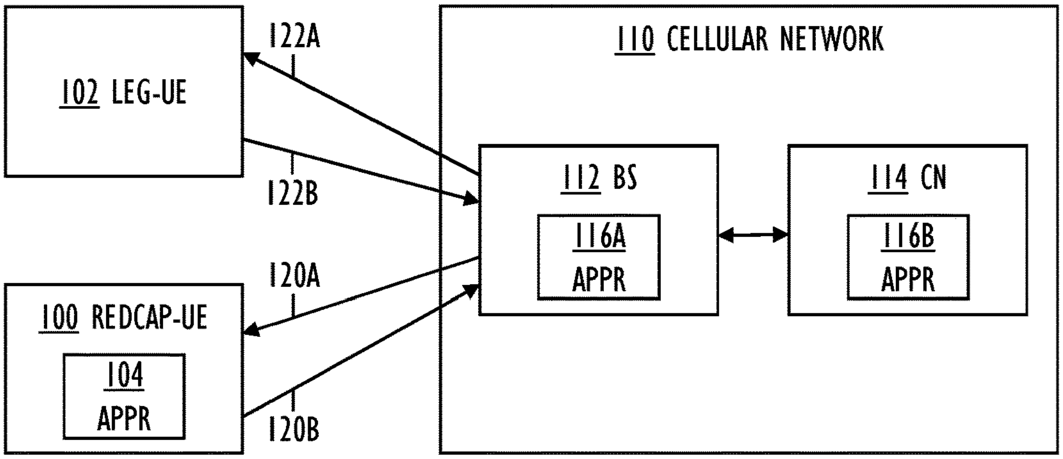

contention resolution of the RACH procedure of the reduced capability user apparatus.

17 Claims, 4 Drawing Sheets

(56) References Cited

U.S. PATENT DOCUMENTS

2021/0329718 A1* 10/2021 Hu ........................ H04W 72/51
2023/0042361 A1* 2/2023 Wu .................. H04W 72/0453

OTHER PUBLICATIONS

"Complexity Reduction for RedCap Devices," Qualcomm Incorporated, 3GPP TSG-RAN WG1 Meeting #104, Jan.-Feb. 2021, Agenda item: 8.6.1, 13 pages.
Finnish Patent and Registration Office Opinion on Patentability for FI20215329, dated Nov. 22, 2021, 8 pages.
Finnish Patent and Registration Office Search Report for FI20215329, dated Nov. 22, 2021, 2 pages.
International Search Report and Written Opinion for PCT/EP2022/057832, mailed Jun. 20, 2022, 12 pages.
"Potential solutions for UE complexity reduction," Huawei, HiSilicon, 3GPP TSG RAN WG1 Meeting #104e, Jan.-Feb. 2021, Agenda item: 8.6.1, 8 pages.
"PUSCH preparation time for PUSCH timing capability 1," 3GPP TS 38.214 V16.0.0, Release 16, Dec. 2019, p. 138.

* cited by examiner

APPARATUSES, METHODS, AND COMPUTER PROGRAMS FOR RACH PROCEDURE

CROSS REFERENCE TO RELATED APPLICATIONS

This is the U.S. National Stage of International Application No. PCT/EP2022/057832, filed Mar. 24, 2022, which was published in English under PCT Article 21(2), which in turn claims the benefit of Finland Application No. 20215329, filed Mar. 24, 2021.

FIELD

Various embodiments relate to an apparatus, method, and computer program for a cellular radio network, and to an apparatus, method, and computer program for a terminal interoperable with the cellular radio network.

BACKGROUND

Traditionally, user apparatuses such as mobile phones and smartphones of cellular radio networks are operating with a full bandwidth, with an initial bandwidth part of a base station of the cellular radio network, for example.

As the Internet of Things (IoT) is emerging, user apparatuses with limited functionalities are becoming more common, such as IoT sensor apparatuses, or machine-type communication (MTC) apparatuses. Such user apparatuses may be called reduced capability (RedCap) user apparatuses, for example. Reduced capability user apparatuses may be cheaper to manufacture and to use. However, as reduced capability user apparatuses are capable of employing only a limited amount of the initial bandwidth part of the base station, the random access channel, or RACH, procedure may be impossible to perform with the base station employing the full bandwidth (like the initial bandwidth part) to gain access to the wireless communication resources of the cellular radio network and serving user apparatuses that are not of reduced capability.

BRIEF DESCRIPTION

According to a first aspect, the invention provides an apparatus for a cellular radio network comprising means for causing the apparatus to perform at least the following: generating system broadcast information indicating random access channel, RACH, occasions for a RACH procedure of a legacy user apparatus capable of employing a downlink and an uplink initial bandwidth part of a base station of the cellular radio network; and causing a transmission of the system broadcast information in a first downlink portion of one or more non-overlapping portions of the downlink initial bandwidth part via the base station; wherein the system broadcast information also indicates, for a RACH procedure of a reduced capability user apparatus capable of employing only a limited amount of each of the downlink and uplink initial bandwidth parts of the base station, i) a set of the RACH occasions for the reduced capability user apparatus that are confined to one or more non-overlapping portions of the uplink initial bandwidth part, and ii) at least one of the one or more non-overlapping portions of the downlink initial bandwidth part containing a control resource set for a random access response and/or a contention resolution of the RACH procedure of the reduced capability user apparatus.

Thus it will be seen that the system broadcast information is transmitted in a portion of the initial bandwidth part that is employable by both legacy user apparatuses and reduced capability user apparatuses, and is thus receivable by both. The system broadcast information indicates RACH occasions for the reduced capability user apparatuses which provides greater flexibility and capacity as it allows offloading of these RACH occasions to different portions of the initial bandwidth part.

In a set of embodiments, the one or more non-overlapping portions of the downlink initial bandwidth part each have a bandwidth that is less than or equal to the limited amount of the downlink initial bandwidth part of the base station that the reduced capability user apparatus is capable of employing; and/or the one or more non-overlapping portions of the uplink initial bandwidth part each have a bandwidth that is less than or equal to the limited amount of the uplink initial bandwidth part of the base station that the reduced capability user apparatus is capable of employing.

Thus it will be seen that, in such embodiments, the RACH procedure may be confined to portions of the uplink and downlink initial bandwidth parts that have a bandwidth that is small enough to be employable by the reduced capability user apparatus.

In a set of embodiments, the system broadcast information indicates: a second downlink portion of the one or more non-overlapping portions of the downlink initial bandwidth part containing the control resource set for a random access response and/or a contention resolution of the RACH procedure of the reduced capability user apparatus, and a first uplink portion of the one or more non-overlapping portions of the uplink initial bandwidth part containing the set of the RACH occasions for a random access preamble of the RACH procedure of the reduced capability user apparatus.

Indicating a second downlink portion for the control resource set in this manner may advantageously enable the apparatus to maximise the used spectrum efficiency by placing the control resource set within the most suitable portion of the initial downlink bandwidth part.

In a set of embodiments, the first downlink portion and the second downlink portion are different from each other.

Thus it will be seen that, in such embodiments, the control resource set for the random access response is transmitted over a different, non-overlapping portion of the initial bandwidth part than the system broadcast information. This advantageously increases the overall capacity of the network, as the system broadcast information may be transmitted at the same time as the control resource set for the random access response, over different frequencies, and thus the system broadcast information and the control resource set for the random access response may be received by different user apparatuses, at the same time, depending on their configuration.

The system broadcast information may be scheduled within a control resource set contained within the first downlink portion, and the random access response and/or contention resolution may be scheduled within the control resource set contained within the second downlink portion. In such embodiments, the overall capacity of the network may also be advantageously increased as the system broadcast information scheduled in the control resource set contained within the first downlink portion may be transmitted at the same time as the random access response and/or contention resolution scheduled within the control resource set contained within the second downlink portion, over different frequencies, with similar advantages to those set out above.

In a set of embodiments, the system broadcast information indicates: a third downlink portion of the one or more non-overlapping portions of the downlink initial bandwidth part containing an additional control resource set for the random access response and/or contention resolution of the RACH procedure of the reduced capability user apparatus, and/or a second uplink portion of the one or more non-overlapping portions of the uplink initial bandwidth part containing an additional set of the RACH occasions for the random access preamble of the RACH procedure of the reduced capability user apparatus.

In a set of embodiments, the second downlink portion and the third downlink portion are different from each other; and/or the first uplink portion and the second uplink portion are different from each other.

Thus it will be seen that, in such embodiments, an additional control resource set for the random access response and/or an additional sets of the RACH occasions for the random access preamble may be transmitted at the same time as the other respective sets, over different, non-overlapping frequencies, the network apparatus choosing which control resource set to use. This advantageously increases the overall capacity of the network, as the apparatus may be able to communicate with an increased number of reduced capability user apparatuses by configuring one or more of them to utilise the additional sets instead of the other respective sets—e.g. where a single respective control resource set and/or set of RACH occasions provides fewer configuration options than that required by the number of reduced capability user apparatuses in communication with the apparatus.

In a set of embodiments, the additional control resource set contained within the third downlink portion comprises a repetition of the control resource set contained within the second downlink portion; and/or the additional set of the RACH occasions contained within the second uplink comprises a repetition of the set of the RACH occasions contained within the first uplink portion.

In a set of embodiments, the system broadcast information indicates: a mapping between the one or more non-overlapping portions of the downlink initial bandwidth part for the RACH procedure of the reduced capability user apparatus and the one or more non-overlapping portions of the uplink initial bandwidth part for the RACH procedure of the reduced capability user apparatus.

In a set of embodiments, the non-overlapping portions of the downlink and uplink initial bandwidth parts are resource block sets, and a predetermined number of contiguous resource blocks forms each resource block set, and the one or more non-overlapping portions of the downlink initial bandwidth part for the RACH procedure of the reduced capability user apparatus are confined within one or more resource block sets of the downlink initial bandwidth part, and the one or more non-overlapping portions of the uplink initial bandwidth part for the RACH procedure of the reduced capability user apparatus are confined within one or more resource block sets of the uplink initial bandwidth part.

In a set of embodiments, the means comprise one or more memories including computer program code, and one or more processors configured to execute the computer program code to cause the performance of the apparatus.

According to a further aspect, the invention provides an apparatus for a terminal interoperable with a cellular radio network comprising means for causing the apparatus to perform at least the following: causing a reception of system broadcast information in a first downlink portion of one or more non-overlapping portions of a downlink initial bandwidth part by a reduced capability user apparatus from a base station of the cellular radio network, wherein the reduced capability user apparatus is capable of employing only a limited amount of each of a downlink and an uplink initial bandwidth part of the base station; extracting, from the system broadcast information, information indicating, for a random access channel, RACH, procedure of the reduced capability user apparatus, i) a set of RACH occasions for the reduced capability user apparatus that are confined to one or more non-overlapping portions of the uplink initial bandwidth part, and ii) at least one of the one or more non-overlapping portions of the downlink initial bandwidth part containing a control resource set for a random access response and/or a contention resolution of the RACH procedure of the reduced capability user apparatus; and causing a performance of the RACH procedure by the reduced capability user apparatus with the base station using the set of the RACH occasions confined to the one or more non-overlapping portions of the uplink initial bandwidth part, and the at least one of the one or more non-overlapping portions of the downlink initial bandwidth part.

Thus it will be seen that the system broadcast information is received in a portion of the initial bandwidth part that is employable by both legacy user apparatuses and reduced capability user apparatuses. This has the advantages set out above.

In a set of embodiments, the one or more non-overlapping portions of the downlink initial bandwidth part each have a bandwidth that is less than or equal to the limited amount of the downlink initial bandwidth part of the base station that the reduced capability user apparatus is capable of employing; and/or the one or more non-overlapping portions of the uplink initial bandwidth part each have a bandwidth that is less than or equal to the limited amount of the uplink initial bandwidth part of the base station that the reduced capability user apparatus is capable of employing.

Thus it will be seen that, in such embodiments, the RACH procedure may be confined to portions of the uplink and downlink initial bandwidth parts that have a bandwidth that is small enough to be employable by the reduced capability user apparatus.

In a set of embodiments, the means are configured to cause the apparatus to also perform the following: in the extracting, obtaining information relating to a second downlink portion of the one or more non-overlapping portions of the downlink initial bandwidth part containing the control resource set for a random access response and/or a contention resolution of the RACH procedure of the reduced capability user apparatus, and obtaining information relating to a first uplink portion of the one or more non-overlapping portions of the uplink initial bandwidth part containing the set of the RACH occasions for a random access preamble of the RACH procedure of the reduced capability user apparatus, and in the causing the performance of the RACH procedure, causing a transmission of the random access preamble using one RACH occasion from the of the RACH occasions contained within the first uplink portion, and causing a reception of the random access response and/or contention resolution using the control resource set contained within the second downlink portion.

Extracting a second downlink portion for the control resource set from the system broadcast information in this manner may advantageously enable the apparatus to maximise the used spectrum efficiency by receiving the control resource set within the most suitable portion of the initial downlink bandwidth part.

In a set of embodiments, the first downlink portion and the second downlink portion are different from each other.

Thus it will be seen that, in such embodiments, the control resource set for the random access response and/or contention resolution is configured for reception over a different, non-overlapping portion of the initial bandwidth part than the system broadcast information. This advantageously increases the overall capacity of the network, as the system broadcast information may be transmitted at the same time as the control resource set for the random access response, over different frequencies, and thus the system broadcast information and the control resource set for the random access response may be received by different user apparatuses, at the same time, depending on their configuration.

The system broadcast information may be scheduled within a control resource set contained within the first downlink portion, and the random access response and/or contention resolution may be scheduled within the control resource set contained within the second downlink portion. In such embodiments, the overall capacity of the network may also be advantageously increased as the system broadcast information scheduled in the control resource set contained within the first downlink portion may be transmitted at the same time as the random access response and/or contention resolution scheduled within the control resource set contained within the second downlink portion, over different frequencies, with similar advantages to those set out above.

In a set of embodiments, the means are configured to cause the apparatus to also perform the following: in the extracting, obtaining information relating to a third downlink portion of the one or more non-overlapping portions of the downlink initial bandwidth part containing an additional control resource set for the random access response and/or contention resolution of the RACH procedure of the reduced capability user apparatus, and/or obtaining information relating to a second uplink portion of the one or more non-overlapping portions of the uplink initial bandwidth part containing an additional set of the RACH occasions for the random access preamble of the RACH procedure of the reduced capability user apparatus, and in the causing the performance of the RACH procedure, causing a transmission of the random access preamble using one RACH occasion from the additional set of the RACH occasions contained within the second uplink portion, and/or causing a reception of the random access response and/or contention resolution using the additional control resource set contained within the third downlink portion.

In a set of embodiments, the second downlink portion and the third downlink portion are different from each other; and/or the first uplink portion and the second uplink portion are different from each other.

Thus it will be seen that, in such embodiments, an additional control resource set for the random access response and/or an additional sets of the RACH occasions for the random access preamble may be configured for reception at the same time as the other respective sets, over different, non-overlapping frequencies, which control resource set to use being a choice of network apparatus. This advantageously increases the overall capacity of the network, as the apparatus may be able to use the additional control resource set and/or the additional set of RACH occasions instead of the other respective sets in order to smoothly coexist with other user apparatuses in communication with the network.

In a set of embodiments, the additional control resource set contained within the third downlink portion comprises a repetition of the control resource set contained within the second downlink portion; and/or the additional set of the RACH occasions contained within the second uplink portion comprises a repetition of the set of the RACH occasions contained within the first uplink portion.

In a set of embodiments, the means are configured to cause the apparatus to also perform the following: in the extracting, obtaining information relating to a mapping between the one or more non-overlapping portions of the downlink initial bandwidth part for the RACH procedure of the reduced capability user apparatus and the one or more non-overlapping portions of the uplink initial bandwidth part for the RACH procedure of the reduced capability user apparatus from the system broadcast information, or from a predetermined configuration data.

In a set of embodiments, the means comprise one or more memories including computer program code, and one or more processors configured to execute the computer program code to cause the performance of the apparatus.

The invention extends to a method in a cellular radio network, comprising: generating system broadcast information indicating random access channel, RACH, occasions for a RACH procedure of a legacy user apparatus capable of employing a downlink and an uplink initial bandwidth part of a base station of the cellular radio network; and causing a transmission of the system broadcast information in a first downlink portion of the one or more non-overlapping portions of the downlink initial bandwidth part via the base station; wherein the system broadcast information also indicates, for a RACH procedure of a reduced capability user apparatus capable of employing only a limited amount of each of the downlink and uplink initial bandwidth parts of the base station, i) a set of the RACH occasions for the reduced capability user apparatus that are confined to one or more non-overlapping portions of the uplink initial bandwidth part, and ii) at least one of the one or more non-overlapping portions of the downlink initial bandwidth part containing a control resource set for a random access response and/or a contention resolution of the RACH procedure of the reduced capability user apparatus.

The invention also extends to a computer-readable medium comprising computer program code, which, when executed by one or more processors, causes performance of the method in a cellular radio network outlined above.

The invention extends to a method in a terminal interoperable with a cellular radio network, comprising: causing a reception of system broadcast information in a first downlink portion of one or more non-overlapping portions of a downlink initial bandwidth part by a reduced capability user apparatus from a base station of the cellular radio network, wherein the reduced capability user apparatus is capable of employing only a limited amount of each of a downlink and an uplink initial bandwidth part of the base station; extracting, from the system broadcast information, information indicating, for a random access channel, RACH, procedure of the reduced capability user apparatus, i) a set of RACH occasions for the reduced capability user apparatus that are confined to one or more non-overlapping portions of the uplink initial bandwidth part, and ii) at least one of the one or more non-overlapping portions of the downlink bandwidth initial part containing a control resource set for a random access response and/or a contention resolution of the RACH procedure of the reduced capability user apparatus; and causing a performance of the RACH procedure by the reduced capability user apparatus with the base station using the set of the RACH occasions confined to the one or more non-overlapping portions of the uplink initial bandwidth part, and the at least one of the one or more non-overlapping portions of the downlink initial bandwidth part.

The invention also extends to a computer-readable medium comprising computer program code, which, when executed by one or more processors, causes performance of the method in a terminal interoperable with a cellular radio network outlined above.

According to a further aspect, the invention provides an apparatus for a cellular radio network configured to: generate system broadcast information indicating random access channel, RACH, occasions for a RACH procedure of a legacy user apparatus capable of employing a downlink and an uplink initial bandwidth part of a base station of the cellular radio network; and cause a transmission of the system broadcast information in a first downlink portion of one or more non-overlapping portions of the downlink initial bandwidth part via the base station; wherein the system broadcast information also indicates, for a RACH procedure of a reduced capability user apparatus capable of employing only a limited amount of each of the downlink and uplink initial bandwidth parts of the base station, i) a set of the RACH occasions for the reduced capability user apparatus that are confined to one or more non-overlapping portions of the uplink initial bandwidth part, and ii) at least one of the one or more non-overlapping portions of the downlink initial bandwidth part containing a control resource set for a random access response and/or a contention resolution of the RACH procedure of the reduced capability user apparatus.

According to a further aspect, the invention provides an apparatus for a terminal interoperable with a cellular radio network configured to: cause a reception of system broadcast information in a first downlink portion of one or more non-overlapping portions of a downlink initial bandwidth part by a reduced capability user apparatus from a base station of the cellular radio network, wherein the reduced capability user apparatus is capable of employing only a limited amount of each of a downlink and an uplink initial bandwidth part of the base station; extract, from the system broadcast information, information indicating, for a random access channel, RACH, procedure of the reduced capability user apparatus, i) a set of RACH occasions for the reduced capability user apparatus that are confined to one or more non-overlapping portions of the uplink initial bandwidth part, and ii) at least one of the one or more non-overlapping portions of the downlink initial bandwidth part containing a control resource set for a random access response and/or a contention resolution of the RACH procedure of the reduced capability user apparatus; and cause a performance of the RACH procedure by the reduced capability user apparatus with the base station using the set of the RACH occasions confined to the one or more non-overlapping portions of the uplink initial bandwidth part, and the at least one of the one or more non-overlapping portions of the downlink initial bandwidth part.

LIST OF DRAWINGS

Figure 2:
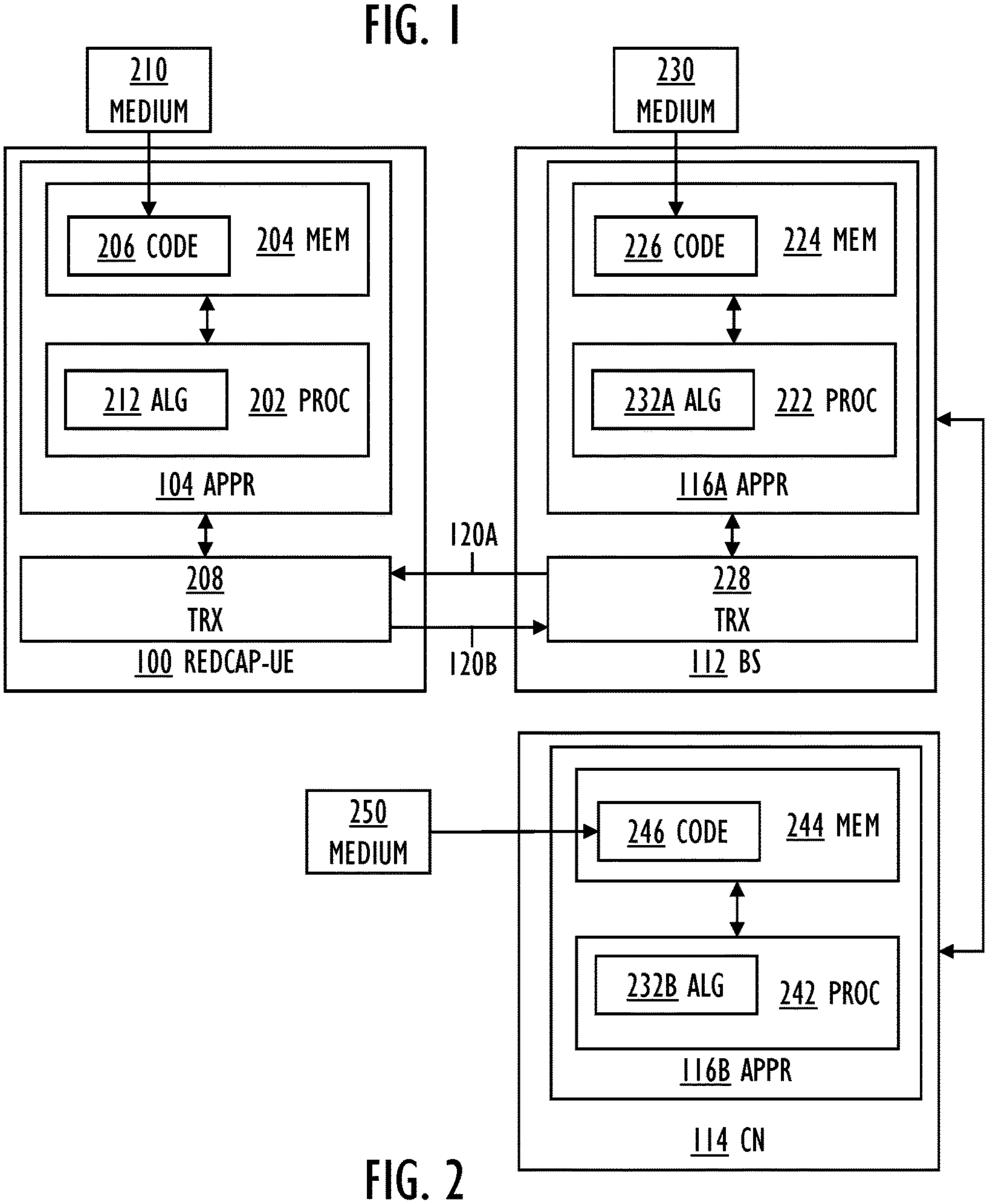
Figure 3:
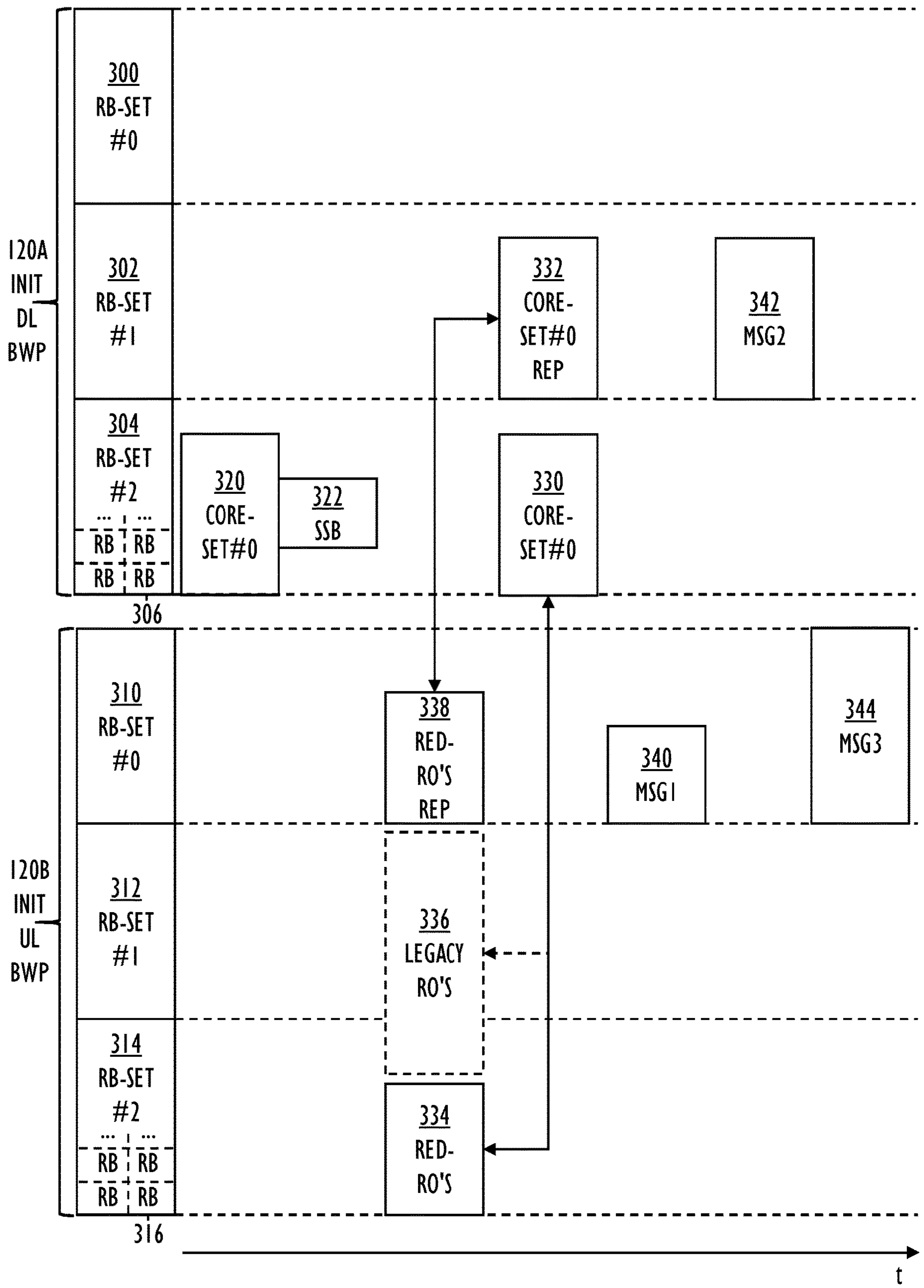
Figure 4:
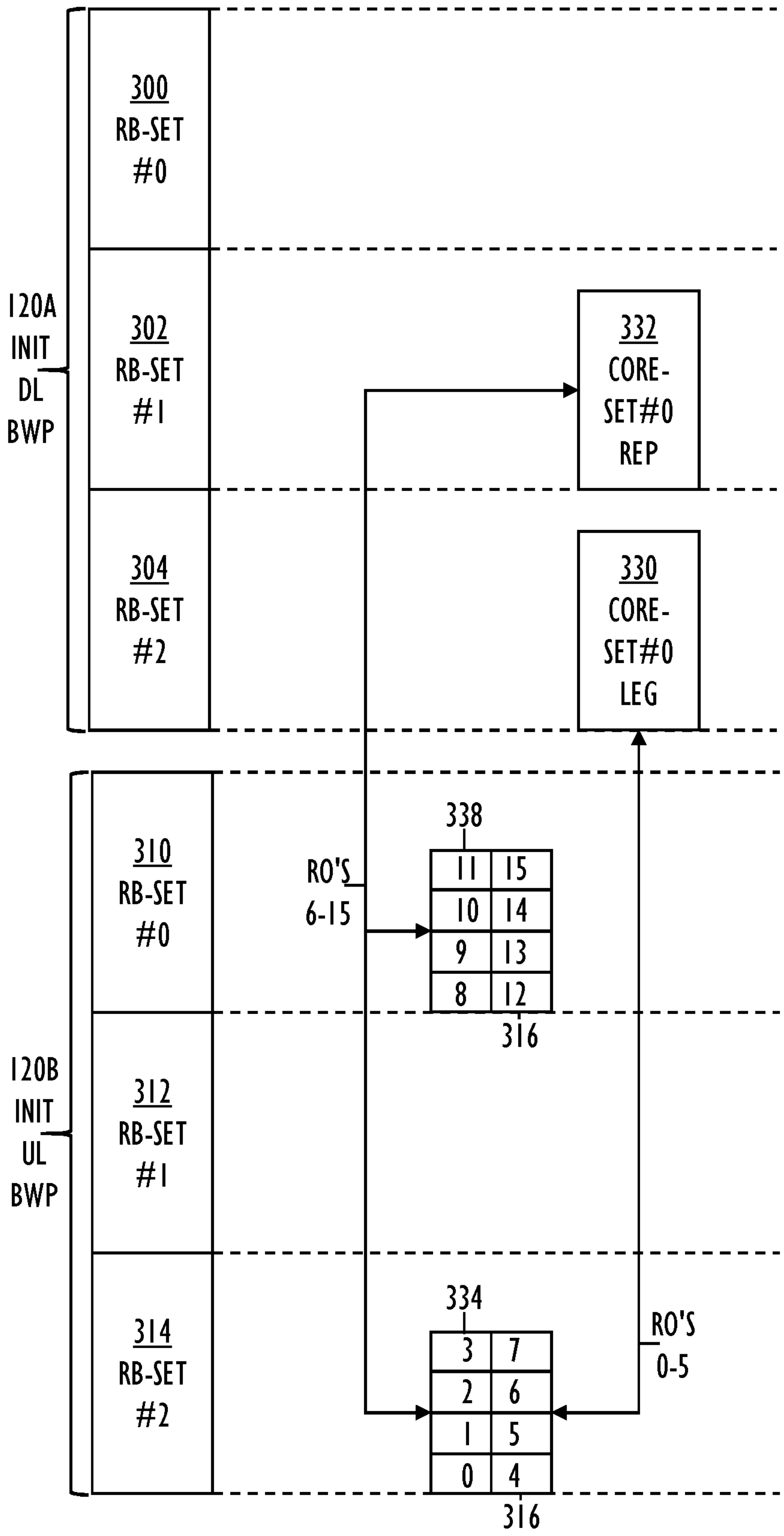
Figure 5:
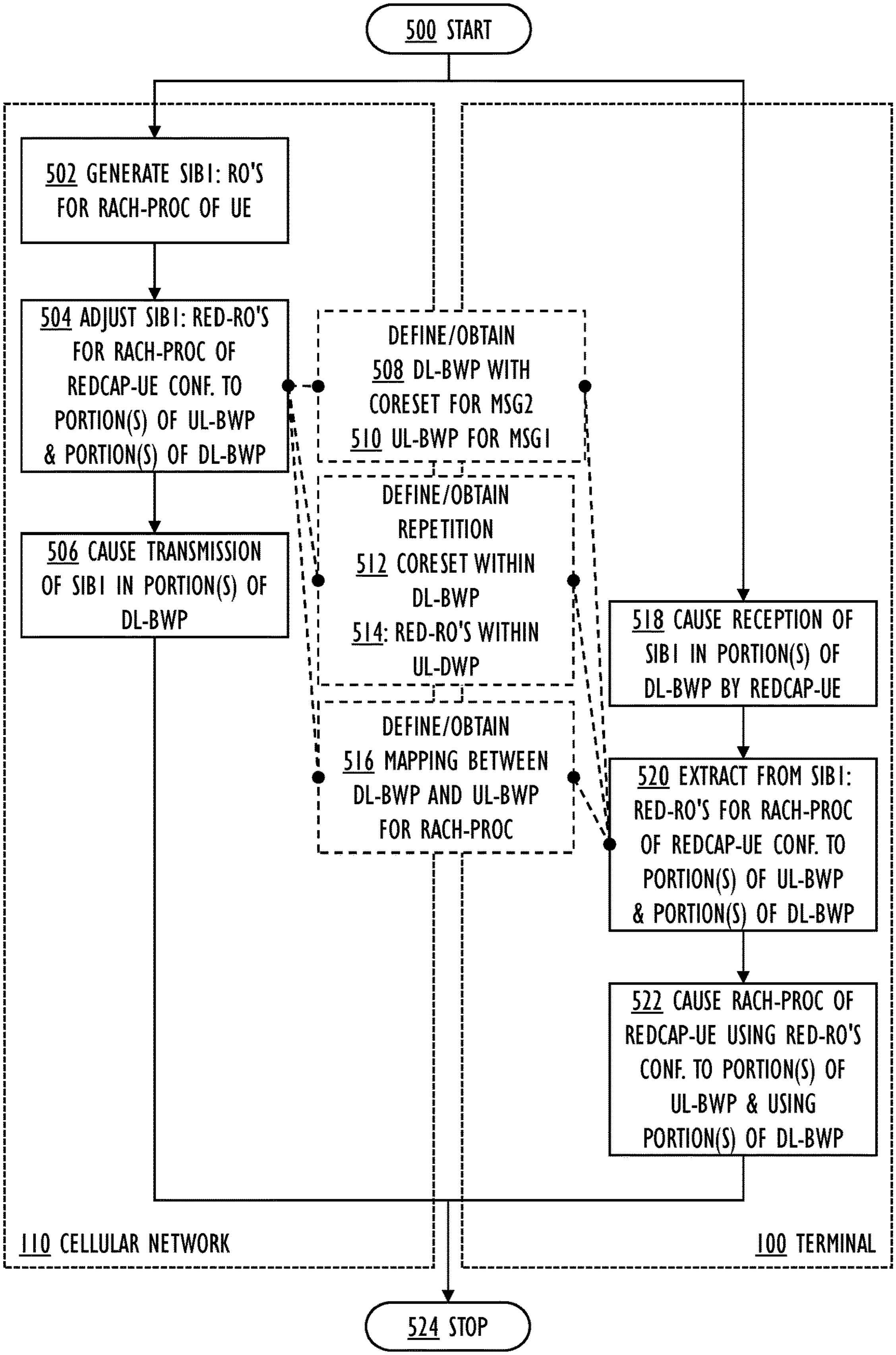

Some embodiments will now be described with reference to the accompanying drawings, in which FIG. 1 and FIG. 2 illustrate embodiments of apparatuses for the cellular radio network and a terminal interoperable with the cellular radio network;

FIG. 3 and FIG. 4 illustrate downlink and uplink bandwidth parts of a base station; and FIG. 5 is a flow chart illustrating methods in the cellular radio network and in the terminal interoperable with the cellular radio network.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Reference numbers, both in the description of the embodiments and in the claims, serve to illustrate the embodiments with reference to the drawings, without limiting it to these examples only.

Let us study FIG. 1 illustrating a cellular radio network 110. The cellular radio network 110 comprises numerous base stations 112. The base station 112 provides an access for user apparatuses (or terminals) 100, 102 residing in a radio cell maintained by the base station 112 to utilize communication resources of the cellular radio network 110. The cellular radio network 110 also comprises a core network 114 with numerous network elements.

The base station (BS) 112 may also be known as a base transceiver station, an access point, or a gNodeB (or gNB), for example. In the 5G NR (Fifth Generation New Radio) 110, the gNB 112 may comprise a radio unit (RU), a distributed unit (DU), and a centralized unit (CU), and the core network 114 may comprise an access & mobility management function (AMF), a session management function (SMF), and a user plane function (UPF), and many other functions.

The user apparatus 100 may be a terminal, e.g. user equipment (UE), a radio terminal, a subscriber terminal, a smartphone, a mobile station, a mobile phone, a portable computer, a tablet computer, a smartwatch, smartglasses, a game terminal, a machine-type communication (MTC) apparatus, an IoT (Internet of Things) apparatus, a sensor apparatus, or some other type of wireless mobile communication device operating with or without a subscriber identification module (SIM) or an eSIM (embedded SIM). The user apparatus 100, 102 may be a device that is configured to associate the user apparatus 100, 102 and its user with a subscription and allows the user to interact with the cellular radio network 110, i.e., the user apparatus 100, 102 is capable of requesting service from the cellular radio network 110. The user apparatus 100, 102 may present information to the user and allow the user to input information. In other words, the user apparatus 100, 102 may be any terminal capable of wirelessly receiving information from and/or wirelessly transmitting information to the cellular radio network 100, 102. Besides communication capabilities, the user apparatus 100, 102 may include computer functionalities, functionalities of other data processing devices, and/or one or more sensors.

Initially, the user apparatus 100, 102 synchronizes in a downlink 120A, 122A and in an uplink 120B, 122B with the base station 112. The downlink 120A, 122A synchronization is achieved as a result of a successful decoding of a synchronization signal block (SSB) by the user apparatus 100, 102. To achieve the uplink 120B, 122B synchronization and a radio resource control (RRC) connection, the user apparatus 100, 102 performs a random access channel (RACH) procedure.

The RACH procedure may contain (in a contention-based random access) four steps:

Msg1=a random access request or a random access preamble transmission on PRACH (Physical Random Access Channel);

Msg2=a random access response on PDCCH/PDSCH (Physical Downlink Control Channel/Physical Downlink Share Channel);

Msg3=a scheduled uplink transmission on PUSCH (Physical Uplink Shared Channel); and Msg4=a contention resolution on PDCCH/PDSCH.

Alternatively, the RACH procedure may be optimized into a two-step RACH procedure, wherein Msg1 and Msg3 are combined to an MsgA and Msg2 and Msg4 are combined to an MsgB.

In this application, two types of user apparatuses are recognized. A legacy user apparatus 102 is capable of employing an initial bandwidth part (BWP) 120A, 120B of the base station 112. A reduced capability user apparatus 100 is capable of employing only a limited amount of the initial bandwidth part 120A, 120B of the base station 112. In an embodiment, the reduced capability user apparatus 100 is an MTC or IoT apparatus, possibly equipped with one or more sensors. The MTC or IoT apparatus 100 may be provided with a limited or no user interface, and besides being mobile, it may be fixedly placed in a building, in a man-made structure, in a vehicle, in a container, in an industrial automation apparatus, etc.

The bandwidth part is illustrated in FIG. 3: an initial downlink bandwidth part 120A, and an initial uplink bandwidth part 120B. In embodiments using the 5G NR, the initial downlink bandwidth part 120A, and the initial uplink bandwidth part 120B may each employ a frequency band of 60 MHz, for example.

The bandwidth part 120A, 120B may be divided into non-overlapping portions 300, 302, 304, 310, 312, 314.

In embodiments using the 5G NR, the non-overlapping portions 300, 302, 304, 310, 312, 314 may be called resource block sets (RB-set). A predetermined number of contiguous (or continuous) resource blocks (RB) 306, 316 may form the resource block set (RB-set) 300, 302, 304, 310, 312, 314. The resource block 306, 316 is the smallest unit of radio resources allocated to a user (of the user apparatus 100, 102).

As shown in FIG. 1, an apparatus 116A and/or 116B is provided for the cellular radio network 110. The apparatus 116A may be an integrated part of the base station 112, such as a part of the gNB (in the DU or CU, for example). The apparatus 116B may be an integrated part of a network element in the core network 114. Either of these apparatuses 116A, 116B is provided, or, alternatively, both of the apparatuses 116A, 116B are provided with a distribution of functionalities between them.

In an embodiment illustrated in FIG. 2, the apparatus 116A, 116B comprises one or more memories 224, 244 including computer program code 226, 246, and one or more processors 222, 242 configured to execute the computer program code 226, 246 to cause the performance of the apparatus 116A, 116B. In an alternative embodiment, the apparatus 116A, 116B comprises a circuitry configured to cause the performance of the apparatus 116A, 116B.

Consequently, the apparatus 116A, 116B may be implemented as a physical unit, or as a service implemented by a networked server apparatus. The networked server apparatus may be a networked computer server, which operates in the cellular radio network 110 according to a client-server architecture, a cloud computing architecture, a peer-to-peer system, or another applicable distributed computing architecture.

As also shown in FIG. 1, an apparatus 104 is provided for the reduced capability user apparatus 100. The apparatus 104 may be an integrated part of the reduced capability user apparatus 100.

In an embodiment illustrated in FIG. 2, the apparatus 104 comprises one or more memories 204 including computer program code 206, and one or more processors 202 configured to execute the computer program code 206 to cause the performance of the apparatus 104. In an alternative embodiment, the apparatus 104 comprises a circuitry configured to cause the performance of the apparatus 104.

Consequently, the apparatus 104 may be a circuitry for the user apparatus 100, or the user apparatus 100 itself. The user apparatus 100 may be a general-purpose off-the-shelf computing device, as opposed to a purpose-build proprietary equipment, whereby research & development costs will be lower as only the special-purpose software (and not the hardware) needs to be designed, implemented, and tested.

A non-exhaustive list of implementation techniques for the processor 202, 222, 242 and the memory 204, 224, 244, or the circuitry includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 204, 224, 244 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code (or software) 206, 226, 246 may be written by a suitable programming language (such as C, C++, assembler or machine language, for example), and the resulting executable code may be stored in the memory 204, 224, 244 and run by the processor 202, 222, 242. The computer program code 206, 226, 246 implements the method/algorithm 212, 232A, 232B illustrated in FIG. 2 and FIG. 5. The computer program code 206, 226, 246 may be in source code form, object code form, executable form, or in some intermediate form, but for use in the one or more processors 202, 222, 242 it is in the executable form. There are many ways to structure the computer program code 206, 226, 246: the operations may be divided into modules, sub-routines, methods, classes, objects, applets, macros, etc., depending on the software design methodology and the programming language used. In modern programming environments, there are software libraries, i.e. compilations of ready-made functions, which may be utilized by the computer program code 206, 226, 246 for performing a wide variety of standard operations. In addition, an operating system (such as a general-purpose operating system or a real-time operating system) may provide the computer program code 206, 226, 246 with system services.

An embodiment provides a computer-readable medium 210, 230, 250 storing the computer program code 206, 226, 246, which, when loaded into the one or more processors 202, 222, 242 and executed by one or more processors 202,

222, 242, causes the one or more processors 202, 222, 242 to perform the computer-implemented method/algorithm 212, 232A, 232B. The computer-readable medium 210, 230, 250 may comprise at least the following: any entity or device capable of carrying the computer program code 206, 226, 246 to the one or more processors 202, 222, 242, a record medium, a computer memory, a read-only memory, an electrical carrier signal, a telecommunications signal, and a software distribution medium. In some jurisdictions, depending on the legislation and the patent practice, the computer-readable medium 210, 230, 250 may not be the telecommunications signal. In an embodiment, the computer-readable medium 210, 230, 250 is a computer-readable storage medium. In an embodiment, the computer-readable medium 210, 230, 250 is a non-transitory computer-readable storage medium.

Now that the general operation environment, the network elements, and the structures of the network elements have been described, let us study the dynamics of the method/algorithm 212, 232A, 232B with reference to FIG. 5, and also with reference to FIG. 3 and FIG. 4 illustrating the downlink and uplink bandwidth parts 120A, 120B of the base station 112

The method starts in 500 and ends in 524. Note that the method is actually divided into two methods: the method/algorithm 232A, 232B in the cellular radio network 110 comprising operations 502-504-506, and the method/algorithm 212 in the terminal 100 interoperable with the cellular radio network 110 comprising operations 518-520-522.

The operations are not strictly in chronological order in FIG. 5, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

In 502, system broadcast information indicating random access channel, RACH, occasions is generated for the RACH procedure of the legacy user apparatus 102 capable of employing the initial bandwidth part 120A, 120B of the base station 112 of the cellular radio network 110.

In 504, the system broadcast information is adjusted to also indicate, for the RACH procedure of the reduced capability user apparatus 100 capable of employing only the limited amount 302, 304, 310, 314 of the initial bandwidth part 120A, 120B of the base station 112, a set 334 of the RACH occasions for the reduced capability user apparatus 100 that are confined to one or more non-overlapping portions 314 of the uplink bandwidth part 120B, and one or more non-overlapping portions 304 of the downlink bandwidth part 120A.

In 506, a transmission of the system broadcast information is caused in one or more non-overlapping portions 304 of the downlink bandwidth part 120A via the base station 112. In embodiments using the 5G NR, the system broadcast information is transmitted in SIB1 (System Information Block Type 1), which together with MIB (Master Information Block) forms MSI (Minimum System Information).

In 518, a reception of system broadcast information is caused in the one or more non-overlapping portions 304 of the downlink bandwidth part 120A by the reduced capability user apparatus 100 from the base station 112 of the cellular radio network 110. The reduced capability user apparatus 100 may thus receive the system broadcast information in the same way as the legacy user apparatus 102.

In 520, it is extracted, from the system broadcast information, information indicating, for the RACH procedure of the reduced capability user apparatus 100, the set 334 of the RACH occasions for the reduced capability user apparatus 100 that are confined to the one or more non-overlapping portions 314 of the uplink bandwidth part 120B, and the one or more non-overlapping portions 304 of the downlink bandwidth part 120A.

In 522, a performance of the RACH procedure is caused by the reduced capability user apparatus 100 with the base station 112 using the set 334 of the RACH occasions confined to the one or more non-overlapping portions 314 of the uplink bandwidth part 120B, and the one or more non-overlapping portions 304 of the downlink bandwidth part 120A.

With these sequences 502-504-506 and 518-520-522, the reduced capability user apparatus 100 is capable of performing the RACH procedure even if the initial bandwidth part 120A, 120B of the base station 112 is beyond its radio capabilities.

In embodiments using the 5G NR as illustrated in FIG. 3, the one or more non-overlapping portions 304 of the downlink bandwidth part 120A for the RACH procedure of the reduced capability user apparatus 100 are confined within one resource block set 304 of the downlink bandwidth part 120A, and the one or more non-overlapping portions 314 of the uplink bandwidth part 120B for the RACH procedure of the reduced capability user apparatus 100 are confined within one resource block set 314 of the uplink bandwidth part 120B.

In the embodiment of FIG. 3, it is assumed that the initial downlink bandwidth part 120A is 60 MHz wide, and the initial uplink bandwidth part 120B is also 60 MHz wide, whereas the reduced capability user apparatus 100 is capable of receiving only one RB-set 304 of 20 MHz, and transmitting only one RB-set 314 of 20 MHz. However, RB-sets are not limited to 20 MHz, they may be 5 or 10 MHz wide, for example. The reduced capability user apparatus 100 may also operate with a predetermined number of resource blocks 306, 316. The mapping between the set 334 of the RACH occasions and the corresponding CORESET #0 330 is illustrated by an arrow: one uplink RB-set 314 maps to one downlink RB-set 304. In this way, the CORESET #0/CommonCORESET 330 is fully confined within one 304 of the downlink RB-sets 300, 302, 304, and the RACH occasions within the set 334 of the RACH occasions are all confined within one 314 of the uplink RB-sets 310, 312, 314.

If a legacy RACH occasion 336, which overlaps two RB-sets 312, 314, were used, the reduced capability user apparatus 100 would not be able to perform the RACH procedure.

In an embodiment, the reduced capability user apparatus 100 operates with RB-sets defined in chapter 7 "UE procedures for transmitting and receiving on a carrier with intra-cell guard bands" of 3GPP TS 38.214 (2019 December) "3rd Generation Partnership Project; Technical Specification Group Radio Access Network; NR; Physical layer procedures for data (Release 16)". The RB-sets were introduced for Release 16 for the purpose of a NR (New Radio) unlicensed operation and particularly to address a LBT (listen-before-talk) failure within a bandwidth part.

As was explained earlier, the reduced capability user apparatus 100 is capable of employing only a limited amount of the initial bandwidth part 120A, 120B of the base station 112. In the embodiment of FIG. 3, the reduced capability user apparatus 100 is capable of employing one RB-set 304 in the downlink and one RB-set 314 in the uplink. However, the reduced capability user apparatus 100 may be configured to employ more than one RB-set, by using the so-called repetition, i.e. an additional RB-set, as will later be explained. Alternatively, the reduced capability user apparatus 100 may also be so configured that it is capable of employing only a part of the RB-set, such as a predetermined amount of resource blocks 306, 316.

After describing the basic sequence 502-504-506 and 518-520-522, let us study some optional embodiments. Note that these embodiments are shown in FIG. 5 as overlapping the cellular radio network 110 and the terminal 100. This means that the data is defined in the cellular radio network 110 side, transmitted from the base station 112 to the user apparatus 100, and then extracted in the terminal 100 side.

In a first optional embodiment, in the adjusting 504, the following operations are performed:

defining 508 the one or more non-overlapping portions 304 of the downlink bandwidth part 120A containing a control resource set (CORESET) 330 for a random access response (or Msg2) 342 of the RACH procedure of the reduced capability user apparatus 100, and defining 510 the one or more non-overlapping portions 314 of the uplink bandwidth part 120B containing the set 334 of the RACH occasions for a random access preamble (or Msg1) 340 of the RACH procedure of the reduced capability user apparatus 100.

In a first optional counterpart embodiment, in the extracting 520, the following operations are performed:

obtaining 508 information of the one or more non-overlapping portions 304 of the downlink bandwidth part 120A containing the control resource set 330 for the random access response 342 of the RACH procedure of the reduced capability user apparatus 100, and obtaining 510 information of the one or more non-overlapping portions 314 of the uplink bandwidth part 120B containing the set 334 of the RACH occasions for the random access preamble 340 of the RACH procedure of the reduced capability user apparatus 100, and in the causing 522 the performance of the RACH procedure, the following operation is performed:

causing a transmission of the random access preamble 340 using one RACH occasion from the set 334 of the RACH occasions of the uplink bandwidth part 120B, and causing a reception of the random access response 342 using the control resource set 330 within one portion 304 of the downlink bandwidth part 120A.

In this way, the first two steps, Msg1 and Msg2, of the RACH procedure may be executed, and after this the RACH procedure may be continued as illustrated by Msg3 344 in FIG. 3. The reduced capability user apparatus 100 may select the reduced RACH occasion for Msg1 from among the reduced RACH occasions 334 of the uplink RB-set 314 using a random selection, or the selection may be based on the UE capabilities.

In a second optional embodiment, in the adjusting 504, the following operations are performed:

defining 512 a repetition of the control resource set 332, i.e. an additional control resource set 332, within one or more non-overlapping portions 302 of the downlink bandwidth part 120A for the random access response 342 of the RACH procedure of the reduced capability user apparatus 100, and/or defining 514 a repetition of the set 338 of the RACH occasions, i.e. an additional set 338 of the RACH occasions, within one or more non-overlapping portions 310 of the uplink bandwidth part 120B for the random access preamble 340 of the RACH procedure of the reduced capability user apparatus 100.

In a second optional counterpart embodiment, in the extracting 520, the following operations are performed:

obtaining 512 information of the repetition of the control resource set 332 within the one or more non-overlapping portions 302 of the downlink bandwidth part 120A for the random access response 342 of the RACH procedure of the reduced capability user apparatus 100, and/or obtaining 514 information of the repetition of the set 338 of the RACH occasions within the one or more non-overlapping portions 310 of the uplink bandwidth part 120B for the random access preamble 340 of the RACH procedure of the reduced capability user apparatus 100, and in the causing 522 the performance of the RACH procedure, the following operations are performed:

causing a transmission of the random access preamble 340 using one RACH occasion from the repetition of the set 338 of the RACH occasions of the uplink bandwidth part 120B, and/or causing a reception of the random access response 342 using the repetition of the control resource set 332 within one portion 302 of the downlink bandwidth part 120A.

In this way, depending on the required capacity and possible congestion, the repetition may be used to add resources for the RACH procedure of the reduced capability user apparatus 100 in the downlink bandwidth part 120A and/or in the uplink bandwidth part 120B. The reduced capability user apparatus 100 may also use a hybrid of the allocated resources for the RACH procedure: instead of using the combinations of 334-330 or 338-332, the combinations of 334-332 or 338-330 may be used.

In an embodiment using the 5G NR, SIB1 comprises an indication of a repetition for a CORESET #0/CommonCORESET. Note that CORESET #0 is configured by MIB/SIB1, and CommonCORESET is configured by SIB1. The indication of the repetition may be a bitmap indicating in which downlink RB-set(s) 302 the CORESET #0 is repeated, for example. SIB1 may also comprise an indication of a repetition for the configured set 338 of the RACH occasions 338 or even a configuration for additional sets of reduced RACH occasions (with a configuration, which is different from the set 334 of the RACH occasions). The indication of the repetition may be a bitmap indicating in which uplink RB-set(s) 310 the set 338 of the RACH occasions is repeated, for example.

In a third optional embodiment, in the adjusting 504, the following operation is performed:

defining 516 a mapping between the one or more non-overlapping portions 302, 304 of the downlink bandwidth part 120A for the RACH procedure of the reduced capability user apparatus 100 and the one or more non-overlapping portions 310, 314 of the uplink bandwidth part 120B for the RACH procedure of the reduced capability user apparatus 100.

In a third optional counterpart embodiment, in the extracting 520, the following operation is performed:

obtaining 516 information of the mapping between the one or more non-overlapping portions 302, 304 of the downlink bandwidth part 120A for the RACH procedure of the reduced capability user apparatus 100 and the one or more non-overlapping portions 310, 314 of the uplink bandwidth part 120B for the RACH procedure of the reduced capability user apparatus 100 from the system broadcast information, or from a predetermined configuration data.

In this way, the mapping may either be more dynamic as communicated in the system broadcast information or less dynamic as obtained from a predetermined configuration data.

In an embodiment using the 5G NR, the mapping is defined between one or more subsets (applicable to the reduced capability user apparatus 100) of all RACH occasions and one or more CORESET #0's. This may be configured as explained, but there may be a predefined mapping in the predetermined configuration data (defined possibly by a telecom standard) to reduce SIB1 overhead.

In this way, the base station 112 may configure different number of repetitions for reduced RACH occasions compared to the number of repetitions for CORESET #0. Normally, as shown in FIG. 3, the repetition of the CORESET #0 332 maps to the repeated reduced RACH occasions 338 in the same ratio as the CORESET #0 330 maps to the reduced RACH occasions 334. But FIG. 4 illustrates an asymmetrical mapping: CORESET #0 330 maps to six RACH occasions (0-5) 316 of the RB-set 314, whereas the repetition of CORESET #0 maps to ten RACH occasions (6-15) 316 of the RB-set 314 and RB-set 310. The reduced capability user apparatus 100 may select the reduced RACH occasion from among the reduced RACH occasions 334, 338 of the uplink RB-sets 310, 314 using a random selection or the selection may be based on the UE capabilities. However, where the reduced capability user apparatus 100 monitors for Msg2 may be determined according to the mapping arrows illustrated in FIG. 3 and FIG. 4. This approach allows the base station 112 to scale the number of repetitions of the reduced RACH occasions and the number of repetitions of the CORESET according to needs, depending on which one is the bottleneck in a particular scenario, for example.

Various embodiments of the invention are described in the following numbered clauses:

Clause 1: An apparatus for a cellular radio network comprising means for causing the apparatus to perform at least the following:

generating system broadcast information indicating random access channel, RACH, occasions for a RACH procedure of a legacy user apparatus capable of employing an initial bandwidth part of a base station of the cellular radio network;

adjusting the system broadcast information to also indicate, for a RACH procedure of a reduced capability user apparatus capable of employing only a limited amount of the initial bandwidth part of the base station, a set of the RACH occasions for the reduced capability user apparatus that are confined to one or more non-overlapping portions of an uplink bandwidth part, and one or more non-overlapping portions of a downlink bandwidth part; and causing a transmission of the system broadcast information in one or more non-overlapping portions of the downlink bandwidth part via the base station.

Clause 2: The apparatus of clause 1, wherein the means are configured to cause the apparatus to also perform the following:

in the adjusting, defining the one or more non-overlapping portions of the downlink bandwidth part containing a control resource set for a random access response of the RACH procedure of the reduced capability user apparatus, and defining the one or more non-overlapping portions of the uplink bandwidth part containing the set of the RACH occasions for a random access preamble of the RACH procedure of the reduced capability user apparatus.

Clause 3: The apparatus of any preceding clause, wherein the means are configured to cause the apparatus to also perform the following:

in the adjusting, defining a repetition of the control resource set within one or more non-overlapping portions of the downlink bandwidth part for the random access response of the RACH procedure of the reduced capability user apparatus, and/or defining a repetition of the set of the RACH occasions within one or more non-overlapping portions of the uplink bandwidth part for the random access preamble of the RACH procedure of the reduced capability user apparatus.

Clause 4: The apparatus of any preceding clause, wherein the means are configured to cause the apparatus to also perform the following:

in the adjusting, defining a mapping between the one or more non-overlapping portions of the downlink bandwidth part for the RACH procedure of the reduced capability user apparatus and the one or more non-overlapping portions of the uplink bandwidth part for the RACH procedure of the reduced capability user apparatus.

Clause 5. The apparatus of any preceding clause, wherein the non-overlapping portions of the bandwidth part are resource block sets, and a predetermined number of contiguous resource blocks forms each resource block set, and the one or more non-overlapping portions of the downlink bandwidth part for the RACH procedure of the reduced capability user apparatus are confined within one or more resource block sets of the downlink bandwidth part, and the one or more non-overlapping portions of the uplink bandwidth part for the RACH procedure of the reduced capability user apparatus are confined within one or more resource block sets of the uplink bandwidth part.

Clause 6. The apparatus of any preceding clause, wherein the means comprise one or more memories including computer program code, and one or more processors configured to execute the computer program code to cause the performance of the apparatus.

Clause 7: An apparatus for a terminal interoperable with a cellular radio network comprising means for causing the apparatus to perform at least the following:

causing a reception of system broadcast information in one or more non-overlapping portions of a downlink bandwidth part by a reduced capability user apparatus from a base station of the cellular radio network, wherein the reduced capability user apparatus is capable of employing only a limited amount of an initial bandwidth part of the base station;

extracting, from the system broadcast information, information indicating, for a random access channel, RACH, procedure of the reduced capability user apparatus, a set of RACH occasions for the reduced capability user apparatus that are confined to one or more non-overlapping portions of an uplink bandwidth part, and one or more non-overlapping portions of the downlink bandwidth part; and causing a performance of the RACH procedure by the reduced capability user apparatus with the base station using the set of the RACH occasions confined to the one or more non-overlapping portions of the uplink bandwidth part, and the one or more non-overlapping portions of the downlink bandwidth part.

Clause 8: The apparatus of clause 7, wherein the means are configured to cause the apparatus to also perform the following:

in the extracting, obtaining information of the one or more non-overlapping portions of the downlink bandwidth part containing a control resource set for a random access response of the RACH procedure of the reduced capability user apparatus, and obtaining information of the one or more non-overlapping portions of the uplink bandwidth part containing the set of the RACH occasions for a random access preamble of the RACH procedure of the reduced capability user apparatus, and in the causing the performance of the RACH procedure, causing a transmission of the random access preamble using one RACH occasion from the set of the RACH occasions of the uplink bandwidth part, and causing a reception of the random access response using the control resource set within one portion of the downlink bandwidth part.

Clause 9: The apparatus of any preceding clause 7 to 8, wherein the means are configured to cause the apparatus to also perform the following:

in the extracting, obtaining information of a repetition of the control resource set within one or more non-overlapping portions of the downlink bandwidth part for the random access response of the RACH procedure of the reduced capability user apparatus, and/or obtaining information of a repetition of the set of the RACH occasions within one or more non-overlapping portions of the uplink bandwidth part for the random access preamble of the RACH procedure of the reduced capability user apparatus, and in the causing the performance of the RACH procedure, causing a transmission of the random access preamble using one RACH occasion from the repetition of the set of the RACH occasions of the uplink bandwidth part, and/or causing a reception of the random access response using the repetition of the control resource set within one portion of the downlink bandwidth part.

Clause 10: The apparatus of any preceding clause 7 to 9, wherein the means are configured to cause the apparatus to also perform the following:

in the extracting, obtaining information of a mapping between the one or more non-overlapping portions of the downlink bandwidth part for the RACH procedure of the reduced capability user apparatus and the one or more non-overlapping portions of the uplink bandwidth part for the RACH procedure of the reduced capability user apparatus from the system broadcast information, or from a predetermined configuration data.

Clause 11: The apparatus of any preceding clause 7 to 10, wherein the means comprise one or more memories including computer program code, and one or more processors configured to execute the computer program code to cause the performance of the apparatus.

Clause 12: A method in a cellular radio network, comprising:

generating system broadcast information indicating random access channel, RACH, occasions for a RACH procedure of a legacy user apparatus capable of employing an initial bandwidth part of a base station of the cellular radio network;

adjusting the system broadcast information to also indicate, for a RACH procedure of a reduced capability user apparatus capable of employing only a limited amount of the initial bandwidth part of the base station, a set of the RACH occasions for the reduced capability user apparatus that are confined to one or more non-overlapping portions of an uplink bandwidth part, and one or more non-overlapping portions of a downlink bandwidth part; and causing a transmission of the system broadcast information in one or more non-overlapping portions of the downlink bandwidth part via the base station.

Clause 13: A method in a terminal interoperable with a cellular radio network, comprising:

causing a reception of system broadcast information in one or more non-overlapping portions of a downlink bandwidth part by a reduced capability user apparatus from a base station of the cellular radio network, wherein the reduced capability user apparatus is capable of employing only a limited amount of an initial bandwidth part of the base station;

extracting, from the system broadcast information, information indicating, for a random access channel, RACH, procedure of the reduced capability user apparatus, a set of RACH occasions for the reduced capability user apparatus that are confined to one or more non-overlapping portions of an uplink bandwidth part, and one or more non-overlapping portions of the downlink bandwidth part; and causing a performance of the RACH procedure by the reduced capability user apparatus with the base station using the set of the RACH occasions confined to the one or more non-overlapping portions of the uplink bandwidth part, and the one or more non-overlapping portions of the downlink bandwidth part.

Clause 14: A computer-readable medium comprising computer program code, which, when executed by one or more processors, causes performance of a method in a cellular radio network, comprising:

generating system broadcast information indicating random access channel, RACH, occasions for a RACH procedure of a legacy user apparatus capable of employing an initial bandwidth part of a base station of the cellular radio network;

adjusting the system broadcast information to also indicate, for a RACH procedure of a reduced capability user apparatus capable of employing only a limited amount of the initial bandwidth part of the base station, a set of the RACH occasions for the reduced capability user apparatus that are confined to one or more non-overlapping portions of an uplink bandwidth part, and one or more non-overlapping portions of a downlink bandwidth part; and causing a transmission of the system broadcast information in one or more non-overlapping portions of the downlink bandwidth part via the base station.

Clause 15: A computer-readable medium comprising computer program code, which, when executed by one or more processors, causes performance of a method in a terminal interoperable with a cellular radio network, comprising:

causing a reception of system broadcast information in one or more non-overlapping portions of a downlink bandwidth part by a reduced capability user apparatus from a base station of the cellular radio network, wherein the reduced capability user apparatus is capable of employing only a limited amount of an initial bandwidth part of the base station;

extracting, from the system broadcast information, information indicating, for a random access channel, RACH, procedure of the reduced capability user apparatus, a set of RACH occasions for the reduced capability user apparatus that are confined to one or more non-overlapping portions of an uplink bandwidth part, and one or more non-overlapping portions of the downlink bandwidth part; and causing a performance of the RACH procedure by the reduced capability user apparatus with the base station using the set of the RACH occasions confined to the one or more non-overlapping portions of the uplink bandwidth part, and the one or more non-overlapping portions of the downlink bandwidth part.

The communication protocols used, the specifications of the cellular radio networks and their network elements develop rapidly. Such development may require extra changes to the described embodiments. Therefore, all words and expressions should be interpreted broadly, and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for a cellular radio network comprising one or more memories including computer program code, and one or more processors configured to execute the computer program code to cause the apparatus to:

generate system broadcast information indicating random access channel (RACH) occasions for a RACH procedure of a legacy user apparatus capable of employing a downlink and an uplink initial access bandwidth part of a base station of the cellular radio network; and cause a transmission of the system broadcast information in a first downlink portion of a plurality of non-overlapping portions of the downlink initial access bandwidth part via the base station;

wherein the system broadcast information also indicates, for a RACH procedure of a reduced capability user apparatus capable of employing only a limited amount of each of the downlink and uplink initial access bandwidth parts of the base station:

a) a second downlink portion of the plurality of non-overlapping portions of the downlink initial access bandwidth part containing a control resource set for a random access response and/or a contention resolution of the RACH procedure of the reduced capability user apparatus, wherein: the first downlink portion and the second downlink portion are different from each other, the control resource set is not transmitted in the first downlink portion, and the system broadcast information is not transmitted in the second downlink portion; and b) a set of the RACH occasions for the reduced capability user apparatus that are confined to one or more non-overlapping portions of the uplink initial access bandwidth part.

2. The apparatus of claim 1, wherein:

the plurality of non-overlapping portions of the downlink initial access bandwidth part each have a bandwidth that is less than or equal to the limited amount of the downlink initial access bandwidth part of the base station that the reduced capability user apparatus is capable of employing; and/or the one or more non-overlapping portions of the uplink initial access bandwidth part each have a bandwidth that is less than or equal to the limited amount of the uplink initial access bandwidth part of the base station that the reduced capability user apparatus is capable of employing.

3. The apparatus of claim 1, wherein the system broadcast information indicates:

a first uplink portion of the one or more non-overlapping portions of the uplink initial access bandwidth part containing the set of the RACH occasions for a random access preamble of the RACH procedure of the reduced capability user apparatus.

4. The apparatus of claim 3, wherein the system broadcast information indicates:

a third downlink portion of the plurality of non-overlapping portions of the downlink initial access bandwidth part containing an additional control resource set for the random access response and/or contention resolution of the RACH procedure of the reduced capability user apparatus, and/or a second uplink portion of the one or more non-overlapping portions of the uplink initial access bandwidth part containing an additional set of the RACH occasions for the random access preamble of the RACH procedure of the reduced capability user apparatus.

5. The apparatus of claim 4, wherein:

the additional control resource set contained within the third downlink portion comprises a repetition of the control resource set contained within the second downlink portion; and/or the additional set of the RACH occasions contained within the second uplink portion comprises a repetition of the set of the RACH occasions contained within the first uplink portion.

6. The apparatus of claim 4, wherein:

the second downlink portion and the third downlink portion are different from each other; and/or the first uplink portion and the second uplink portion are different from each other.

7. The apparatus of claim 1, wherein the system broadcast information indicates:

a mapping between the plurality of non-overlapping portions of the downlink initial access bandwidth part for the RACH procedure of the reduced capability user apparatus and the one or more non-overlapping portions of the uplink initial access bandwidth part for the RACH procedure of the reduced capability user apparatus.

8. The apparatus of claim 1, wherein the non-overlapping portions of the downlink and uplink initial access bandwidth parts are resource block sets, and a predetermined number of contiguous resource blocks forms each resource block set, and the plurality of non-overlapping portions of the downlink initial access bandwidth part for the RACH procedure of the reduced capability user apparatus are confined within a plurality of resource block sets of the downlink initial access bandwidth part, and the one or more non-overlapping portions of the uplink initial access bandwidth part for the RACH procedure of the reduced capability user apparatus are confined within one or more resource block sets of the uplink initial access bandwidth part.

9. An apparatus for a terminal interoperable with a cellular radio network comprising one or more memories including computer program code, and one or more processors configured to execute the computer program code to cause the apparatus to:

cause a reception of system broadcast information in a first downlink portion of a plurality of non-overlapping portions of a downlink initial access bandwidth part by a reduced capability user apparatus from a base station of the cellular radio network, wherein the reduced capability user apparatus is capable of employing only a limited amount of each of a downlink and an uplink initial access bandwidth part of the base station;

extract, from the system broadcast information, information indicating, for a random access channel (RACH) procedure of the reduced capability user apparatus:

a) a second downlink portion of the plurality of non-overlapping portions of the downlink initial access bandwidth part containing the control resource set for a random access response and/or a contention resolution of the RACH procedure of the reduced capability user apparatus, wherein: the first downlink portion and the second downlink portion are different from each other, the control resource set is not transmitted in the first downlink portion, and the system broadcast information is not transmitted in the second downlink portion; and b) a set of RACH occasions for the reduced capability user apparatus that are confined to one or more non-overlapping portions of the uplink initial access bandwidth part;

cause a performance of the RACH procedure by the reduced capability user apparatus with the base station using the set of the RACH occasions confined to the one or more non-overlapping portions of the uplink initial access bandwidth part, and cause a reception of the random access response and/or contention resolution using the control resource set contained within the second downlink portion.

10. The apparatus of claim 9, wherein:

the plurality of non-overlapping portions of the downlink initial access bandwidth part each have a bandwidth that is less than or equal to the limited amount of the downlink initial access bandwidth part of the base station that the reduced capability user apparatus is capable of employing; and/or the one or more non-overlapping portions of the uplink initial access bandwidth part each have a bandwidth that is less than or equal to the limited amount of the uplink initial access bandwidth part of the base station that the reduced capability user apparatus is capable of employing.

11. The apparatus of claim 9, wherein the one or more memories including computer program code, and one or more processors configured to execute the computer program code are configured to cause the apparatus to also:

in the extracting, obtain information relating to a first uplink portion of the one or more non-overlapping portions of the uplink initial access bandwidth part containing the set of the RACH occasions for a random access preamble of the RACH procedure of the reduced capability user apparatus, and in the causing the performance of the RACH procedure, cause a transmission of the random access preamble using one RACH occasion from the set of the RACH occasions contained within the first uplink portion.

12. The apparatus of claim 11, wherein the one or more memories including computer program code, and one or more processors configured to execute the computer program code are configured to cause the apparatus to also:

in the extracting, obtain information relating to a third downlink portion of the plurality of non-overlapping portions of the downlink initial access bandwidth part containing an additional control resource set for the random access response and/or contention resolution of the RACH procedure of the reduced capability user apparatus, and/or obtain information relating to a second uplink portion of the one or more non-overlapping portions of the uplink initial access bandwidth part containing an additional set of the RACH occasions for the random access preamble of the RACH procedure of the reduced capability user apparatus, and in the causing the performance of the RACH procedure, cause a transmission of the random access preamble using one RACH occasion from the additional set of the RACH occasions contained within the second uplink portion, and/or cause a reception of the random access response and/or contention resolution using the additional control resource set contained within the third downlink portion.

13. The apparatus of claim 12, wherein:

the additional control resource set contained within the third downlink portion comprises a repetition of the control resource set contained within the second downlink portion; and/or the additional set of the RACH occasions contained within the second uplink portion comprises a repetition of the set of the RACH occasions contained within the first uplink portion.

14. The apparatus of claim 12, wherein:

the second downlink portion and the third downlink portion are different from each other; and/or the first uplink portion and the second uplink portion are different from each other.

15. The apparatus of claim 9, wherein the one or more memories including computer program code, and one or more processors configured to execute the computer program code are configured to cause the apparatus to also:

in the extracting, obtain information relating to a mapping between the plurality of non-overlapping portions of the downlink initial access bandwidth part for the RACH procedure of the reduced capability user apparatus and the one or more non-overlapping portions of the uplink initial access bandwidth part for the RACH procedure of the reduced capability user apparatus from the system broadcast information, or from a predetermined configuration data.

16. A method in a terminal interoperable with a cellular radio network, comprising:

causing a reception of system broadcast information in a first downlink portion of a plurality of non-overlapping portions of a downlink initial access bandwidth part by a reduced capability user apparatus from a base station of the cellular radio network, wherein the reduced capability user apparatus is capable of employing only a limited amount of each of a downlink and an uplink initial access bandwidth part of the base station;

extracting, from the system broadcast information, information indicating, for a random access channel (RACH) procedure of the reduced capability user apparatus:

a) a second downlink portion of the plurality of non-overlapping portions of the downlink initial access bandwidth part containing the control resource set for a random access response and/or a contention resolution of the RACH procedure of the reduced capability user apparatus, wherein: the first downlink portion and the second downlink portion are different from each other, the control resource set is not transmitted in the first downlink portion, and the system broadcast information is not transmitted in the second downlink portion; and b) a set of RACH occasions for the reduced capability user apparatus that are confined to one or more non-overlapping portions of the uplink initial access bandwidth part; and causing a performance of the RACH procedure by the reduced capability user apparatus with the base station using the set of the RACH occasions confined to the one or more non-overlapping portions of the uplink initial access bandwidth part, and cause a reception of the random access response and/or contention resolution using the control resource set contained within the second downlink portion.

17. A non-transitory computer-readable medium comprising computer program code, which, when executed by one or more processors, causes performance of the method in a terminal interoperable with a cellular radio network of claim 16.

* * * * *